United States Patent [19]

Woollenweber

[11] 3,993,370
[45] Nov. 23, 1976

[54] LUBRICATED BEARING STRUCTURE

[75] Inventor: William E. Woollenweber, Columbus, Ind.

[73] Assignee: Cummins Engine Company, Inc., Columbus, Ind.

[22] Filed: Mar. 27, 1974

[21] Appl. No.: 455,066

[30] Foreign Application Priority Data
Apr. 6, 1973 United Kingdom............... 16522/73

[52] U.S. Cl..................................... 308/121; 308/9; 308/78; 308/108; 308/113; 308/122; 308/125; 308/240
[51] Int. Cl.² ..................... F16C 1/24; F16C 17/16; F16C 33/66; F16C 39/04
[58] Field of Search ............... 308/9, 36.1, 78, 113, 308/121, 122, 123, 124, 125, 240, 108

[56] References Cited
UNITED STATES PATENTS

| | | | |
|---|---|---|---|
| 1,999,266 | 4/1935 | Warlop | 308/121 |
| 3,043,636 | 7/1962 | MacInnes et al. | 308/121 |
| 3,056,634 | 10/1962 | Woollenweber, Jr. et al. | 308/78 |
| 3,096,126 | 7/1963 | Woollenweber, Jr. et al. | 308/9 |
| 3,390,926 | 7/1968 | Woollenweber, Jr. | 308/122 |
| 3,410,616 | 11/1968 | Dee | 308/9 |
| 3,494,679 | 2/1970 | Burdette | 308/36.1 |
| 3,565,497 | 2/1971 | Miller | 308/36.1 |

*Primary Examiner*—L. J. Paperner
*Assistant Examiner*—Howard Beltran
*Attorney, Agent, or Firm*—Neuman, Williams, Anderson & Olson

[57] ABSTRACT

A bearing structure is provided for use in machinery wherein certain components thereof operate at high rotational speeds. The structure includes a shaft mounted for rotation within a stationary housing member. A pair of bearings, arranged in longitudinally spaced relation, is disposed between the shaft and the adjacent surface of the housing member. The housing member is provided with a passage for high pressure oil terminating at each bearing. Each bearing is of sleeve-like configuration and is provided with a plurality of radial holes which are in communication with the oil passage of the housing member. A plurality of longitudinal openings are formed in each bearing and interconnect the end faces of a bearing. The openings communicate with the holes of the bearing thereby permitting oil to flow to the end faces.

8 Claims, 6 Drawing Figures

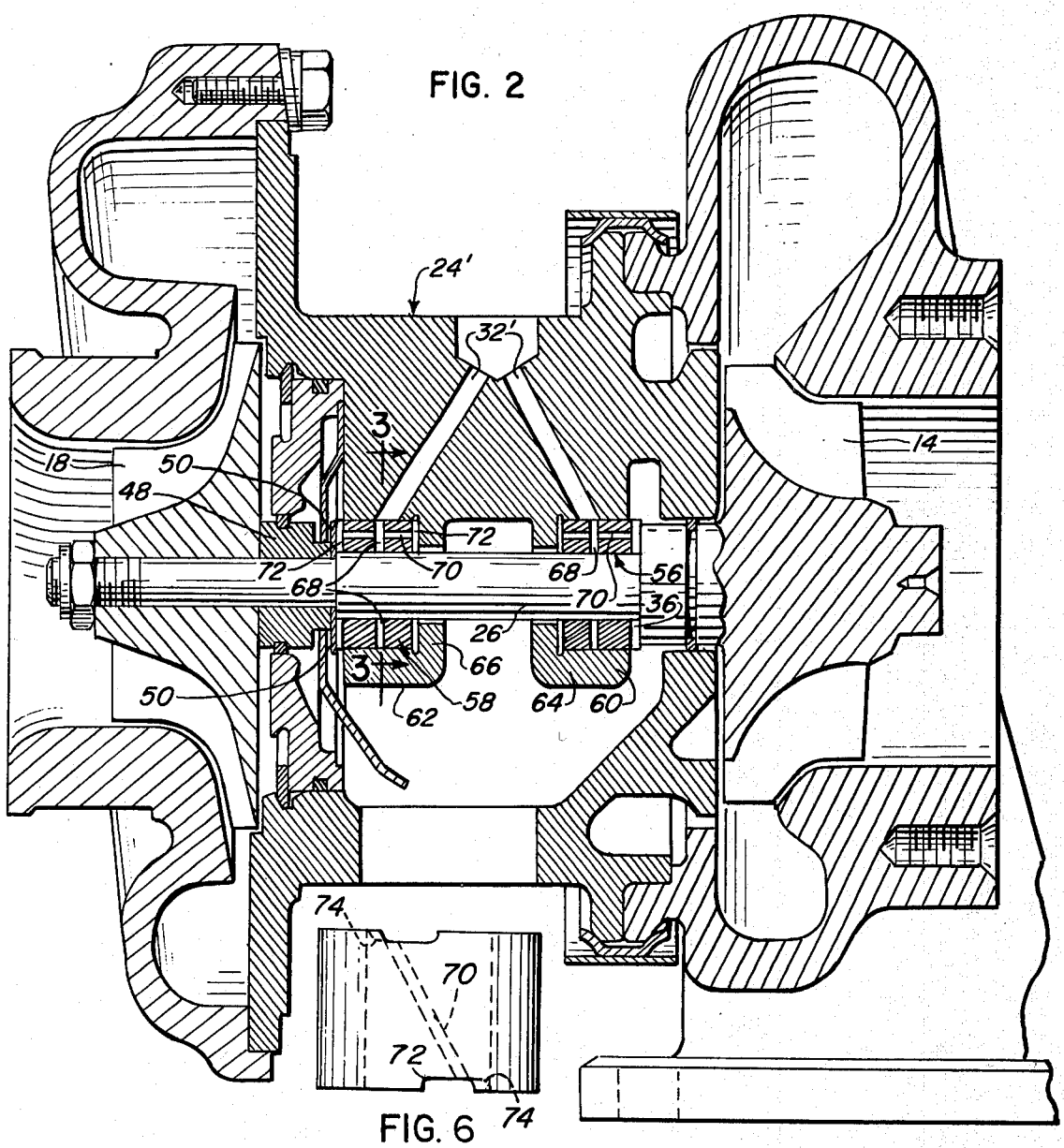
FIG. 2
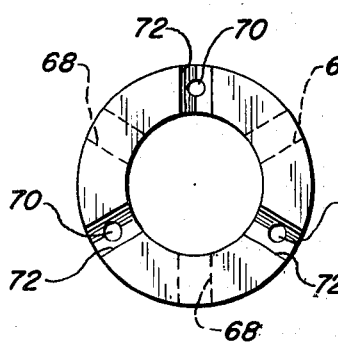
FIG. 4
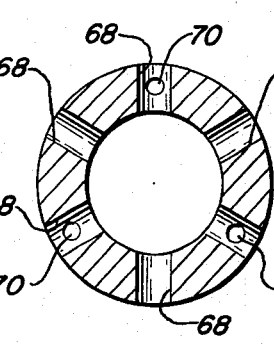
FIG. 3
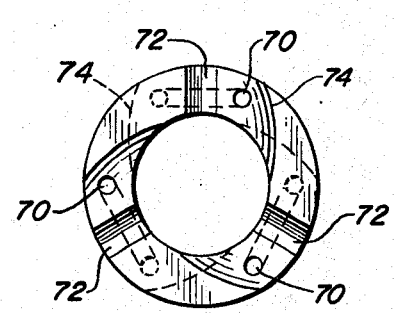
FIG. 5
FIG. 6

LUBRICATED BEARING STRUCTURE

BACKGROUND OF THE INVENTION

This invention relates to a bearing structure for machinery which operates at high rotational speeds.

It has been difficult to design satisfactory bearing systems for high-speed rotating systems. One particular example is in bearing systems for turbochargers which have caused difficulties due to the very high speed of rotation of the rotor assembly, combined with the extreme light weight of the rotor components. "Shaft whirl" or "Shaft whip" has always been a specific problem that needed to be overcome before the turbocharger as used today could attain sufficient durability to become practical and usable on internal combustion engines. In addition, the turbocharger must be an extremely low cost device so that it becomes economically feasible for use on high volume diesel and gasoline engines such as are used in motor vehicles, farm tractors, etc.

Devising a stable bearing system that is simple in construction, rugged enough to withstand rough handling and easily serviced in the field in case of trouble has been the object of much time and effort over the past years. A number of bearing systems of this general type have been and are currently being used in turbochargers. Some of these systems are disclosed in U.S. Pat. Nos. 3,096,126; 3,056,634; and 3,390,926.

It has been found that providing a floating sleeve bearing of substantially heavy wall thickness allows the shaft to rotate very stably at high speed. In such a situation, the outer oil film between the bearing and the stationary housing is of much larger area than the inner film between the bearing and the rotor shaft, thereby resulting in the frictional drag being greater between the bearing and stationary housing than between the shaft and bearing. Thus, the bearing rotates at a speed much less than the speed of the shaft. The two fluid films provide a cushion for unbalance forces as well as a cushion against an external force acting on the housing. The total clearance existing by virtue of the two fluid films gives the rotor greater freedom to find and rotate about its center of mass leading to stable operation at the extreme high speeds at which turbocharger-rotating assemblies must run.

According to the present invention, a thrust and journal bearing assembly is provided which comprises two sleeve bearings located within a housing and disposed between rotatable members. Annular bearing surfaces are provided by the housing for engaging the inner end faces of the sleeve bearings.

The bearing assembly of the present invention results in a less costly combined journal and thrust bearing in which the stability of the bearing system is maintained. The improved bearing assembly also provides both radial and longitudinal bearing support for the rotating assembly whereby the reduced speed of rotation of the bearings relative to the rotor provides a reduced relative speed between the rotating surfaces of the rotor and the mating thrust surfaces on the bearing. This reduced relative speed leads to reduced losses compared to existing systems where the thrust load of the rotating assembly is carried on a stationary surface attached to the stationary housing.

In the improved assembly oil under pressure is introduced through passages to the outer-bearing surfaces and provides lubrication for this surface. In addition, the oil is carried through the sleeve bearings to feed the thrust surfaces on one or both ends of the sleeve bearing.

Preferably, each bearing includes a plurality of radial holes extending therethrough for introducing the lubricating oil to the inner-bearing surfaces. In order to provide an adequate oil supply to the thrust surfaces on the ends of the bearing, each bearing preferably includes axial holes extending therethrough and communicating with the radial holes carrying the pressurized oil. Thus, a direct supply of cool oil is introduced to all four thrust surfaces. Where reference is made to axial holes throughout the specification and claims, it is not intended to be limited to holes along or parallel to the axis of the bearing but is intended as well to mean holes or grooves extending in an non-axial direction from a radial hole to an end face of the bearing.

The thrust or end face surfaces of the bearings may be of a variety of types; for example, they may carry radial grooves desirably of V-shaped cross-section wherein the sides of each groove form an included angle of approximately 150°. The axial oil holes extending through the bearing may communicate with some or all of the end face grooves. Alternately, however, the axial holes through the bearings may communicate with the portions of the end face disposed between the radial grooves. In the latter construction, at least part of the surface portion between each pair of radial grooves may be inclined to the axis of the bearing thus providing a tapered wedge-shaped thrust bearing surface. If desired, the axial holes may be positioned so as to communicate with the tapered wedge thrust-bearing surface at or near the area of maximum clearance so that the oil provides a thrust-bearing surface with maximum load-carrying capacity.

As a further alternative construction, axial grooves might be provided in the outer and inner journal surfaces of the bearing for the purposes of carrying oil to the thrust-bearing surfaces. This latter construction, however, reduces the area of the bearing surfaces. Using axial holes through the bearings allows oil to be fed to all thrust-bearing surfaces without any loss in the journal-bearing area and consequently without any loss in the load-carrying capacity of a given size bearing.

Although the present invention is not limited to particular rotational machinery, it is especially suitable for use in turbochargers.

DESCRIPTION

The invention will now be further described by way of example with reference to the accompanying drawings, in which:

FIG. 2 is a similar sectional view of a turbocharger incorporating a bearing assembly in accordance with one embodiment of the invention;

FIG. 3 is a section on line III—III of FIG. 2;

FIG. 4 is an end view of the bearing component of FIG. 3; and

FIG. 5 is an end view of an alternative construction of the bearing component.

FIG. 6 is a top plan view of the end portion of the bearing component shown in FIG. 5.

Figure 1:
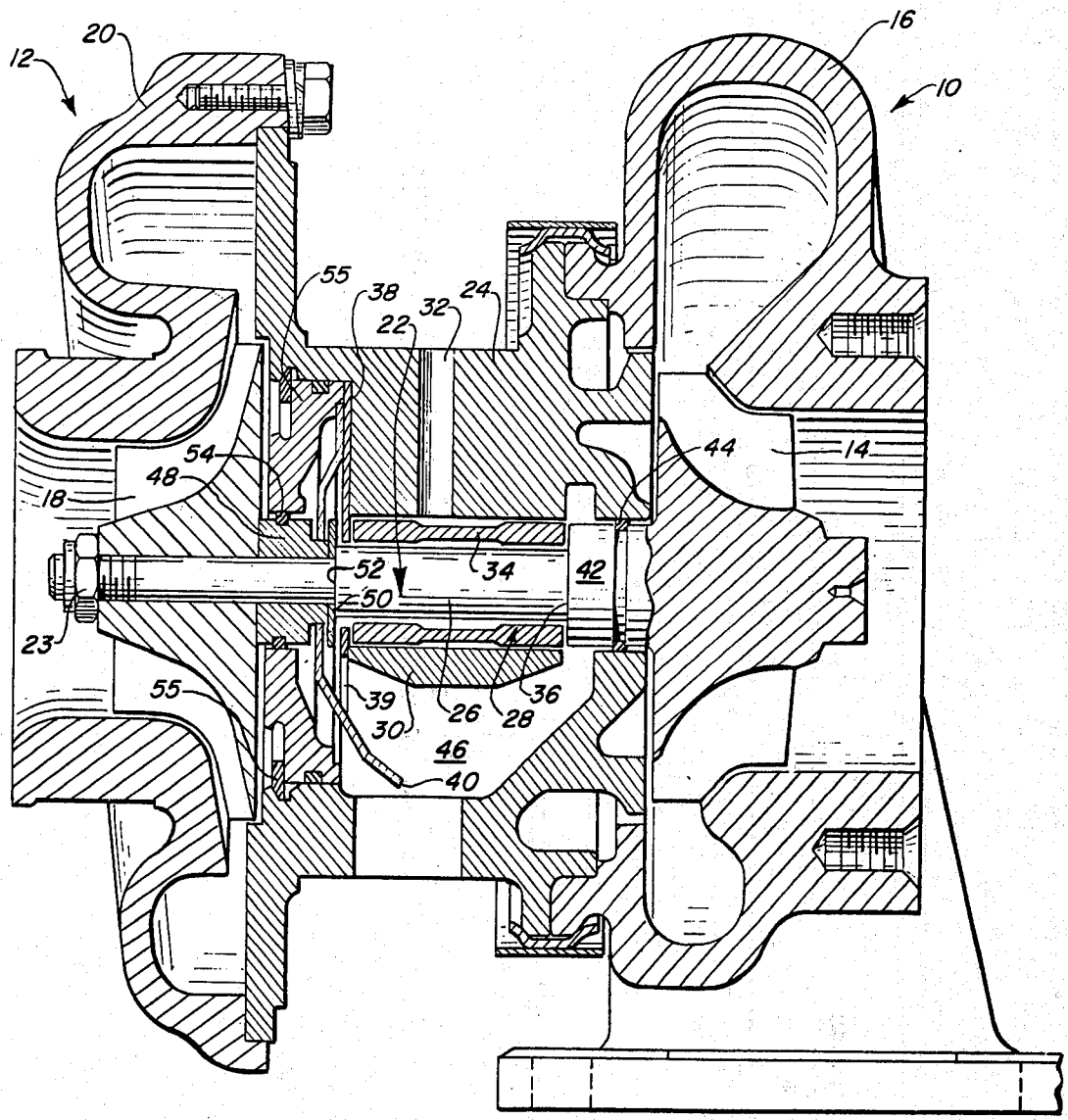
FIG. 1 is a sectional view of a turbocharger incorporating a conventional bearing construction.

Referring to FIG. 1, a bearing assembly is shown which is of a type disclosed in U.S. Pat. No. 3,390,926.

The turbocharger of FIG. 1 is of a common type and comprises a turbine assembly indicated generally at 10 and a compressor assembly indicated generally at 12. The turbine assembly 10 includes a turbine wheel 14 disposed within housing 16, and the compressor assembly 12 includes a metallic (e.g., aluminium) compressor wheel 18 and a housing 20 therefor. In accordance with normal practice, the turbine wheel 14 and the compressor wheel 18 are mounted on a common shaft 22 whereby the wheels and shaft rotate as a unit about the shaft as an axis. The shaft 22 is welded at one end to the turbine wheel 14 and the other end of the shaft 22 extends through the compressor wheel 18 and threadedly engages a nut 23 so as to attach the compressor wheel to the shaft. The turbine housing 16 and the compressor housing 20 are linked by a housing member 24 which accommodates the shaft 22. A portion 26 of the shaft 22 is encircled by a full sleeve tubular bearing 28 rotatably located in a sleeve section 30 of the housing member 24. The housing member 24 is provided with a lubricating oil passage 32 which communicates with a central depressed portion 34 of the tubular bearing 28 and provides a means for introducing lubricating oil under pressure (e.g., from the lubrication system of an internal combustion engine where the turbocharger is being used for engine supercharging) into the bearing. A shoulder 36 is formed on the shaft 22. A thrust plate 38 including a cut-away portion 39 is secured to the housing member 24 together with an oil deflector plate 40. The lower portion of the thrust plate 38 is bevelled to engage an adjacent portion of the deflector plate 40. The surface of plate 38, adjacent the bearing 28, provides a thrust surface for the bearing. An enlarged portion 42 of the shaft 22 accommodates a cast iron sealing ring 44 which excludes oil and prevents it from migrating into the turbine blade area from the chamber 46 into which oil from the bearing drains. At the compressor end of the shaft 22, a spacer sleeve 48 is locked onto the shaft trapping thrust collar 50 against shoulder 52 on the shaft 22. A cast iron sealing ring 54 cooperates with the spacer sleeve 48 and compressor housing backing plate 55 to seal the compressor area from the bearing lubrication area.

In operation, the turbine assembly 10 is driven by a supply of gas having a high degree of energy (e.g., exhaust gas being emitted from an internal combustion engine). The turbine assembly in turn drives the compressor assembly which draws in a supply of gas (e.g., air), compresses it and may deliver same to an internal combustion engine for supercharging purposes. The shaft 22 thus rotates at high speeds. When the thrust load is acting in a direction toward the turbine assembly 10, the thrust collar 50 bears against the stationary thrust plate 38. Thus, a high relative speed exists between the contacting surfaces of these two parts. When the thrust load acts in the opposite direction (i.e., toward the compressor assembly 12), the tubular bearing 28 carries the thrust load from the shaft shoulder 36 to the back surface of the stationary thrust plate 38. In this case, there is a reduced relative speed between the shaft 22 and the thrust surface due to the rotation of the tubular bearing. The thrust bearing losses in this case are reduced.

To lubricate the system, oil is fed under pressure to oil passage 32 which diverts the oil to the central depressed portion 34 of the bearing 28.

Referring now to FIG. 2, there is shown a turbocharger of the same general type as that of FIG. 1 and where possible like numbers have been used to denote like parts.

In FIG. 2, however, the bearing assembly is in accordance with a preferred embodiment of the present invention.

The bearing assembly shown in FIG. 2 comprises two identical sleeve bearings 56 and 58, one of which is shown in greater detail in FIGS. 3 and 4. Each bearing surrounds a portion of the shaft 22 and is rotatably located in sleeve portion or journal section 60 or 62, the latter forming a part of a housing member 24'. The sleeve portions 60, 62 include annular flanges 64, 66, respectively, which provide annular-bearing surfaces for the respective sleeve bearings 56, 58. In the improved bearing assembly, the stationary thrust plate 38 is omitted, and thrust collar 50 provides a thrust-bearing surface for the bearing 58. Shoulder 36 formed on the shaft provides the other thrust-bearing surface for the bearing 56.

The housing member 24' is provided with two oil passages 32', one for each of the bearings 56, 58. The passages provide a means of introducing oil under pressure to each of the bearings 56, 58. A plurality (e.g., six) of radial holes 68 are provided in each bearing 56, 58 to allow oil to pass to the interface between the shaft 22 and the bearings 56, 58. A plurality (e.g., three) of axial holes 70 are provided in each of the bearings. The holes 70 communicate with certain of the radial holes 68 so as to carry oil under pressure to the four thrust end faces of the bearings 56, 58. Each end face of the bearings 56, 58 may include three radial grooves 72 of V-shaped cross section having an included angle of approximately 150°. The axial holes 70 communicate with these grooves thereby enabling the oil to be distributed over the end faces (see FIG. 4).

The operation of the bearing structure shown in FIGS. 2 to 4 is similar to that shown in FIG. 1; however, in the improved structure (FIG. 2) the thrust-bearing interfaces are between the four end faces of the bearings 56, 58, shaft shoulder 36, flanges 64 and 66 and thrust collar 50.

It can be seen that none of the thrust-bearing interfaces is between the shaft which rotates at very high speed and a stationary surface, but are between the sleeve bearings which rotate at speeds less than the speed of rotation of the shaft and stationary surfaces. Thus, the improved bearing assembly as compared to the assembly shown in FIG. 1 provides reduced relative speed between the rotating assembly and the thrust-bearing surfaces on the combined journal and thrust bearings, regardless of the direction in which the thrust force acts.

Furthermore, by eliminating the thrust plate 38 in the improved bearing structure, the cost of the assembly has been substantially reduced because such a thrust plate is expensive, being normally constructed of steel on one side and copper-lead and bronze on the other side. The structure of FIG. 2 also replaces the long tubular bearing 28 embodied in the FIG. 1 structure with two shorter bearings 56, 58 of like construction requiring much less expensive bronze material for their construction. Finally, a positive pressure-lubricating oil supply is provided for all four thrust end faces which allows better lubrication of these important surfaces.

Assembly and servicing of the bearings are accomplished with ease since both bearings may be identical and be placed in the assembly without regard to which end of the bearing is inserted first.

It will be appreciated that many modifications of the structure of FIGS. 2 to 4 are possible without departing from the scope of the invention. For example, the number and/or configuration of the oil holes and grooves 68, 70 and 72 may be varied from that shown. Furthermore, some or all of the axial holes 70 may communicate with areas between the grooves 72 rather than with the grooves themselves.

A modified structure is shown in FIG. 5 wherein portions of the end faces of the bearings disposed between the radial grooves 72 may be inclined as at 74 to the axis of the bearing; thus, providing a tapered wedge-shaped thrust-bearing surface. The axial holes 70 may be arranged to communicate with the tapered wedge-shaped thrust-bearing surface 74 at or near the area of maximum clearance so that oil is fed into the tapered wedge and provides a thrust-bearing surface with maximum load-carrying capacity. The tapered surfaces at the opposite end of the bearing from that shown may be offset from the grooves in another direction so that the axial holes 70 are not parallel to the bearing axis but may be disposed at a slight angle thereto. The tapered area may be such that the deepest part thereof is adjacent the groove. This arrangement enables the holes 70 to communicate with the source of the radial holes 68 which lie behind the groove 72.

In a further modified structure, not shown, axial grooves formed in the outer and inner journal surfaces may be substituted for the axial holes 70.

I claim:

1. A bearing structure for a shouldered shaft rotating at high speed and being subjected to thrust forces applied thereto in both directions, said structure comprising a stationary member having a pair of longitudinally spaced journal sections adapted to surround portions of the shaft and being disposed to one side of a shaft shoulder, adjacent end portions of said sections being provided with inwardly projecting bearing surfaces, the opposite end of one section being disposed adjacent the shaft shoulder and the opposite end of the other section being disposed adjacent a thrust collar, said stationary member being provided with a passage for a lubricant, said passage being in communication with each journal section; and a pair of floating elongated sleeve bearings rotatably mounted within said journal sections, each sleeve bearing having an inner surface in proximity to and encompassing a shaft portion and an outer surface in proximity to an adjacent surface of a journal section, each sleeve bearing being provided with a first port means for the lubricant interconnecting the inner and outer surfaces thereof and being in communication with the lubricant passage, and a second port means for the lubricant interconnecting the end faces of said sleeve bearing and being in communication with the lubricant passage, said sleeve bearings being rotatable with said shaft but at a slower speed.

2. The bearing structure of claim 1 wherein the sleeve bearings are of like construction.

3. The bearing structure of claim 1 wherein at least one end face of each sleeve bearing is provided with a groove interconnecting the inner and outer surfaces of the sleeve bearing.

4. The bearing structure of claim 3 wherein one end of the second port means terminates at said groove.

5. The bearing structure of claim 3 wherein one end of the second port means is offset relative to said groove.

6. The bearing structure of claim 1 wherein both end faces of each sleeve bearing are provided with a plurality of symmetrically arranged, radially extending grooves interconnecting the inner and outer surfaces of said sleeve bearing.

7. The bearing structure of claim 6 wherein corresponding grooves on the end faces of said sleeve member are interconnected by said second port means.

8. The bearing structure of claim 6 wherein the grooves on one end face of a sleeve bearing are annularly offset relative to the grooves on the other end face of said sleeve bearing.

* * * * *

UNITED STATES PATENT AND TRADEMARK OFFICE
CERTIFICATE OF CORRECTION

PATENT NO. : 3,993,370
DATED : November 23, 1976
INVENTOR(S) : William E. Woollenweber It is certified that error appears in the above-identified patent and that said Letters Patent are hereby corrected as shown below:

Column 2, line 38, "purposes" should be --purpose-- line 63, after "a" insert --fragmentary--

Column 6, claim 7, lines 2 & 3, "member" should read -- bearing--

Signed and Sealed this

Eighth Day of March 1977

[SEAL]

Attest:

RUTH C. MASON
Attesting Officer

C. MARSHALL DANN
Commissioner of Patents and Trademarks